US010605396B2

(12) United States Patent
Acker et al.

(10) Patent No.: US 10,605,396 B2
(45) Date of Patent: Mar. 31, 2020

(54) TOOL FOR WORKING ON THE WALL OF A PIPE AND RELATED METHOD

(71) Applicant: ENGIE, Courbevoie (FR)

(72) Inventors: Benoit Acker, Bondues (FR); Maxime Lecchi, Sartrouville (FR); Charles Francois-Albert Fernandez, Meudon (FR); Roland Nierhoff, Saint Denis (FR)

(73) Assignee: ENGIE, Courbevoie (FR)

( * ) Notice: Subject to any disclaimer, the term of this patent is extended or adjusted under 35 U.S.C. 154(b) by 0 days.

(21) Appl. No.: 16/178,056

(22) Filed: Nov. 1, 2018

(65) Prior Publication Data

US 2019/0072223 A1 Mar. 7, 2019

Related U.S. Application Data

(63) Continuation of application No. 15/115,260, filed as application No. PCT/FR2015/050178 on Jan. 27, 2015, now Pat. No. 10,215,323.

(30) Foreign Application Priority Data

Jan. 28, 2014 (FR) .................................... 14 00210

(51) Int. Cl.
*F16L 55/18* (2006.01)
*F16L 55/128* (2006.01)
*F16L 55/16* (2006.01)

(52) U.S. Cl.
CPC ....... *F16L 55/1283* (2013.01); *F16L 55/1612* (2013.01)

(58) Field of Classification Search
CPC ............ F16L 55/1645; F16L 55/16455; E21B 33/1243

(Continued)

(56) References Cited

U.S. PATENT DOCUMENTS 3,103,235 A 9/1963 Stringham, III
3,356,777 A * 12/1967 Barrett ................ F16L 55/1645
264/36.17

(Continued)

FOREIGN PATENT DOCUMENTS

EP 0096958 A1 12/1983
EP 0114727 A1 8/1984

(Continued)

OTHER PUBLICATIONS

International Search Report dated Apr. 22, 2015 in connection with International Patent Application No. PCT/FR2015/050178, 7 pages.

(Continued)

*Primary Examiner* — Patrick F Brinson

(57) ABSTRACT

An intervention method for acting on a wall of a fluid pipeline using a tool includes moving the tool inside the pipeline until a pipe segment of the tool is positioned facing a zone of the wall of the pipeline. The method also includes creating sealing upstream and downstream from the zone using first and second seals of the tool so as to seal off an outer portion of a segment of the pipeline around the zone. The method further includes acting on the zone of the wall. The sealing by the first and second seals occurs in two portions of the pipeline so as to define a sealing lock between the two portions of the pipeline. The first seal is in two portions, and the second seal is in two portions.

26 Claims, 3 Drawing Sheets

(58) Field of Classification Search
USPC .................. 138/93, 97; 277/612; 396/19
See application file for complete search history.

(56) References Cited

U.S. PATENT DOCUMENTS

| | | | |
|---|---|---|---|
| 3,561,490 A | | 2/1971 | Little |
| 3,618,241 A | | 11/1971 | Pecak |
| 3,618,639 A | | 11/1971 | Daley et al. |
| 3,834,421 A | * | 9/1974 | Daley ............... F16L 55/16455 138/97 |
| 3,834,422 A | | 9/1974 | Larson |
| 3,885,521 A | * | 5/1975 | von Arx ................... B05C 7/08 118/105 |
| 3,903,728 A | | 9/1975 | Matthews, Jr. |
| 3,946,761 A | * | 3/1976 | Thompson ........ F16L 55/16455 138/98 |
| 4,363,545 A | * | 12/1982 | Schaefer ............. G03B 37/005 346/33 P |
| 4,413,655 A | | 11/1983 | Brown |
| 4,434,427 A | * | 2/1984 | Clarke ................ G03B 37/005 346/33 P |
| 4,598,250 A | * | 7/1986 | Lorenzi ................. G01N 27/82 324/220 |
| 4,646,787 A | | 3/1987 | Rush et al. |
| 4,691,728 A | | 9/1987 | Mathison |
| 4,861,248 A | * | 8/1989 | Ben ................... F16L 55/16455 425/13 |
| 5,027,895 A | | 7/1991 | Barton |
| 5,722,463 A | | 3/1998 | Smyth et al. |
| 6,439,580 B1 | * | 8/2002 | Hecht ...................... E03F 3/06 138/89 |
| 6,752,175 B1 | | 6/2004 | Willschuetz et al. |
| 8,087,119 B2 | | 1/2012 | Mousa |
| 9,206,938 B2 | * | 12/2015 | Thursby ................ G01M 3/005 |
| 2004/0003855 A1 | | 1/2004 | Dees et al. |

FOREIGN PATENT DOCUMENTS

| | | |
|---|---|---|
| EP | 0291373 A1 | 11/1988 |
| EP | 0377141 A2 | 7/1990 |
| FR | 2550846 A1 | 2/1985 |
| RU | 2406014 C2 | 12/2010 |
| SU | 1024652 A1 | 6/1983 |
| SU | 1560888 A2 | 4/1990 |
| WO | 95/07433 A1 | 3/1995 |
| WO | 2007/141554 A1 | 12/2007 |

OTHER PUBLICATIONS

Written Opinion of the International Searching Authority dated Apr. 22, 2015 in connection with International Patent Application No. PCT/FR2015/050178, 11 pages.

Search Report dated Sep. 20, 2018 in connection with Russian Patent Application No. 2016135007, 2 pages.

* cited by examiner

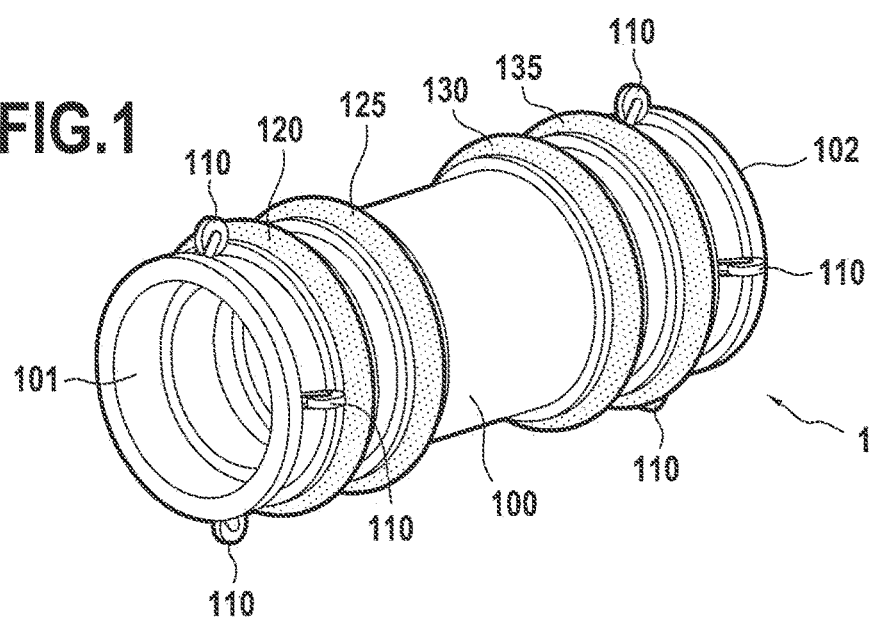
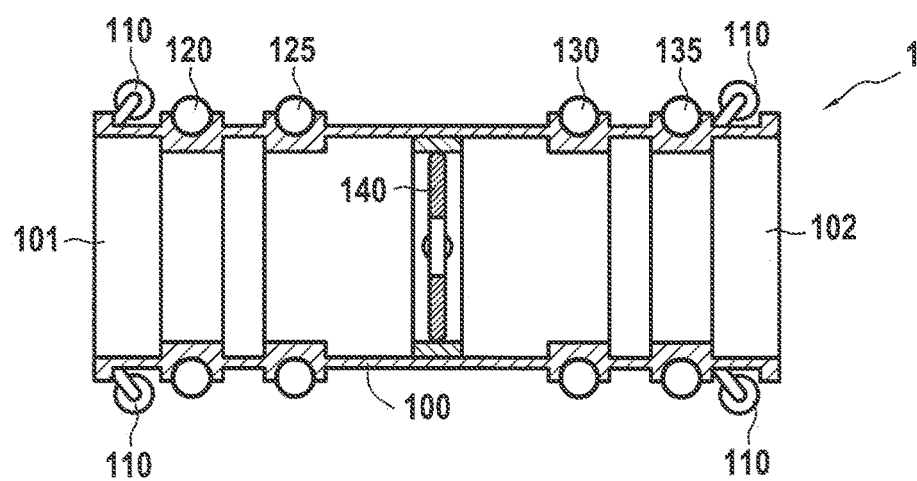
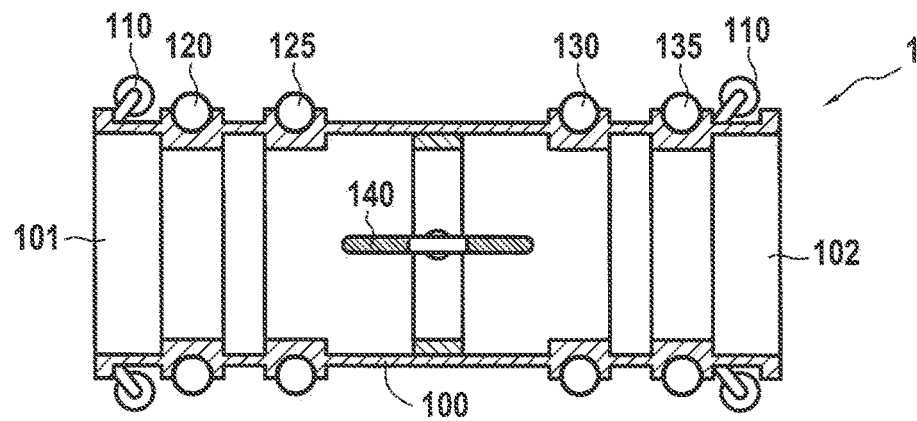

TOOL FOR WORKING ON THE WALL OF A PIPE AND RELATED METHOD

CROSS-REFERENCE TO RELATED APPLICATIONS AND PRIORITY CLAIM

This application claims priority under 35 U.S.C. § 120 as a continuation of U.S. patent application Ser. No. 15/115,260 filed on Jul. 28, 2016, which claims priority under 35 U.S.C. § 365 to International Patent Application No. PCT/FR2015/050178 filed on Jan. 27, 2015, which claims priority to French Patent Application No. 1400210 filed on Jan. 28, 2014. All of these applications are hereby incorporated by reference in their entirety.

TECHNICAL FIELD

The invention lies in the field of tools and methods for acting on the walls of pipelines for transporting fluid, such as pipelines for hydrocarbons in liquid or gaseous form, or indeed pipelines for transporting water. Generally, the fluid (liquid or gas) is under pressure while the network of which the pipeline forms a part is in use. More particularly, the purpose of such action is to repair the pipeline, or indeed to weld fittings to the pipeline.

The pipelines concerned may be in the open air, or they may be buried pipelines, or they may be undersea pipelines. While they are in use, which may continue for numerous years, their walls may present defects due to phenomena of corrosion or of mechanical attack, and thus be in need of repair.

As a general rule, a repair needs to be performed by removing pressure from a segment of the pipeline on either side of the defect that is to be repaired, while still allowing the fluid to pass through, since any interruption could have severe economic consequences for the operator of the pipeline or of the network. The repair is preferably performed after removing fluid from the segment on either side of the defect (e.g. removing gas or removing water).

In the same manner, when it is desired to make a weld to the outer wall of the pipeline, it is sometimes necessary to interrupt the flow of fluid in the segment in question, in particular in order to avoid the material cooling excessively, which would be harmful for the quality of the welding and for its durability.

There exist systems, which are expensive and complex to use that are suitable for removing pressure and discharging the fluid, such as stoppers under load and their associated accessories (stopple, reinforcing saddle, hot tapping, balloons). There also exist systems involving a temporary jumper hose for maintaining transit, which systems are complex in structure and also complex to handle given their implications in terms of operator safety.

Also known is Document WO 2007/141554, which discloses apparatus serving in particular to patch a defect by introducing an inner pipe into the pipeline, the inner pipe being positioned facing the defect, and by introducing an expandable component that is arranged around the pipe and that is activated so as to be inflated in order to plug the defect from the inside. A variant of the apparatus is also used to put a valve into place in the pipeline.

That apparatus implies leaving a voluminous tool in place in the pipeline, and it is therefore not very satisfactory since the pipeline remains partially obstructed after the action has been taken.

Also known is Document WO 03/067134, which discloses apparatus for interrupting (shutting off) fluid flow in a high pressure pipeline. The use of that apparatus requires fluid flow to be interrupted or a branch connection to be made, which is not satisfactory.

SUMMARY

In this context, the invention proposes an intervention tool for taking action on the wall of a fluid pipeline, the tool comprising a pipe segment for positioning inside the pipeline facing a zone of the wall and one or more first or upstream means for creating sealing between the wall of the pipeline and the pipe segment.

According to a general characteristic, the tool further comprises one or more second or downstream means for creating sealing between the wall of the pipeline and the pipe segment in order to isolate an outer portion of a segment of the pipeline from the flowing fluid between the two means for creating sealing, and at least the first or the second means for creating sealing are in two portions, defining a sealing lock between the two portions of said first or second means for creating sealing.

By means of such a tool, it is possible to create a sealed peripheral zone (or volume) in a segment of the pipeline facing and in contact with the zone (or surface) of the wall on which it is desired to take action.

This sealed zone is isolated from the flowing fluid, which can be advantageous thermally speaking in the context of taking welding type action on the wall. However the sealed zone may also, where necessary, be subjected to decompression or indeed emptying in order to take action on the wall without pressure and indeed without the presence of the fluid, even though the fluid continues to flow through the pipe segment. Thus, the tool enables a pipeline to be repaired (or some other action to be taken thereon) without interrupting the operation of the network, and it also makes it possible to reduce the time needed for taking action. Its ease and reliability of use makes this tool particularly advantageous compared with the above-mentioned prior art systems. It should be observed in particular that there is no external bypass system, since such a system is made pointless by the presence of the pipe segment inside the tool.

The locks defined by the two portions serve to improve safety, in particular for applications in which pressures are high. This applies in particular for gas transport networks where pressures may be as great as 67 bars. The safety provided by the tool is then reinforced, as is the reliability of the intervention process.

In a particular embodiment, the first or the second means for creating sealing comprise expandable and retractable sealing gaskets, e.g. inflated with oil using an oil/nitrogen accumulator, or expandable by compression using a system of moving plates.

In an advantageous embodiment, the tool further comprises adjustable propulsion means for propelling it in the pipeline. These means may be controllable, and they may also be arranged to make use of the movement of the fluid so as to take advantage of an entrainment phenomenon for driving the tool. The propulsion means may comprise at least one adjustable flap installed in the pipe segment. The propulsion means may for example be actuated for adjustment and control purposes by means of a hydraulic system powered by an oil/nitrogen accumulator, by an electromechanical system powered by batteries, or indeed by a combination of such systems.

In certain embodiments, the tool may also include a system guiding the tool inside the pipeline. The guide system may in particular comprise at least one wheel or deformable disk at each end of the pipe segment.

In optional and advantageous manner, it is also proposed that the pipe segment includes a length of bellows in order to enable it to travel in curved pipelines.

Advantageously, the tool may include a braking system and/or a system for holding the tool in position by contact with the inside wall of the pipeline. This braking and/or position-maintaining system may operate by friction against the inside wall of the pipeline, contact with the inside wall, or by braking the guide wheels.

In an embodiment, the tool may also include a retarder system suitable for slowing down the movement of the tool without being capable of stopping it. By way of example, this system may be of the electromagnetic type.

Advantageously, the tool may also include a communication system enabling the tool to be located and controlled remotely from outside the pipeline, e.g. by using electromagnetic waves or sound waves.

In advantageous, but optional, manner, the sealing systems may be configured to brake the movement of the tool by rubbing against the inside wall of the pipeline and/or to hold the tool in position by coming into contact with the inside wall of the pipeline.

The invention also provides a method for acting on the wall of a fluid pipeline by using a tool of the invention, the method comprising a step of moving the tool inside the pipeline until the pipe segment is positioned inside the pipeline facing a zone of the wall of said pipeline, a step of creating sealing upstream and downstream from said zone respectively by using first and second means for creating sealing in order to seal off an outer portion of a segment of the pipeline around the zone of the wall (or to seal off a volume defined by the tool and the pipeline), and then, if necessary, a step of decompressing said portion (or said volume). Finally, the method comprises a step of taking action on said zone of the wall.

At least the first or the second means for creating sealing are in two portions, defining a sealing lock between the two portions of said first or second means for creating sealing.

The action is preferably taken from the outside of the pipe by a human operator or by apparatus.

In implementations in which the first or the second sealing means are expandable and retractable, they are actuated to expand in order to create sealing and to retract after action has been taken.

In certain implementations, the tool is propelled by the movement of the fluid.

In certain implementations, the movement of the tool in the pipeline and the actuation of the sealing means are remotely controlled.

In an implementation, the positioning is performed by using an abutment placed inside the pipeline, the method including a prior step of hot tapping the pipeline in order to put said abutment into place.

In a particular implementation, the outer portion facing the zone where action is to be taken is decompressed by using a valve, the method comprising a prior step of hot tapping the pipeline in order to put said valve into place.

In an implementation, a braking device, which may include or be included in the sealing systems acting by friction, may be used in order to brake the movement of the tool before it reaches the abutment.

In an implementation, a retarder device may be used to slow down the movements of the tool, without necessarily stopping it.

In an implementation, a position-maintaining system that may include or be included in the sealing system, may be used to hold the tool in position by making contact with the inside wall of the pipeline.

Finally, it is specified that the step of taking action may comprise, amongst other possible actions: making a repair by a welded patch, making a repair by build-out welding, or welding a fitting to the pipeline.

In an implementation, the method includes decompressing each of the locks by using a valve.

LIST OF FIGURES

The present invention is described below with reference to the accompanying figures.

FIG. 1 is a three-quarter view of the tool in an embodiment of the invention.

FIG. 2 is a longitudinal section of the FIG. 1 tool.

FIG. 3 shows the same section, with the propulsion flap open.

DETAILED DESCRIPTION

Figure 4:
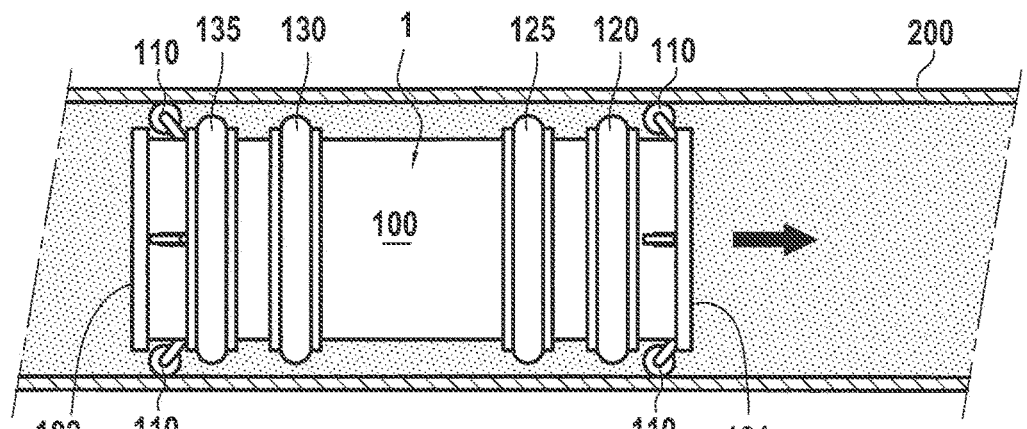
FIG. 4 shows the tool being moved in a pipeline.

FIG. 1 shows a tool 1 in an embodiment of the invention, in a three-quarter view. It comprises a pipe segment 100, which in this example is a rigid circular cylinder with open mouths 101 and 102 that are plane and lie in planes that are perpendicular to the axis of the cylinder, thereby constituting circles.

Close to the mouth 101, the outside of the pipe segment 100 carries guide wheels 110 (or guide casters) that are arranged in regular manner around its circumference, e.g. in a common plane. In the example shown, there are four of them. Similar guide means, in this example other guide wheels 110, are present in the proximity of the mouth 102. Other guide means could be used, such as for example guide disks. It is possible to combine guide means of different types.

Still in the proximity of the mouth 101, on the outside of the pipe segment, there is a first inflatable sealing gasket 120. When inflated, this inflatable sealing gasket 120 is designed to press against the inside wall of the pipeline in which the tool travels. Conversely, when deflated, the gasket is folded down against the pipe segment 100. The inflatable gasket 120 constitutes a body of revolution of profile that is circular or non-circular, e.g. a toroidal body having as its axis of revolution the axis of revolution of the pipe segment, and surrounding the pipe segment. The inflatable sealing gasket 120 can be inflated by means of a hydraulic system that is remotely controllable and that includes an oil/nitrogen accumulator. It is followed on the pipe segment at a short distance towards the second mouth 102 by a second inflatable sealing gasket 125, similar to the first, and likewise surrounding the pipe segment 100. Continuing towards the second mouth 102, there is a third inflatable sealing gasket 130 that is once more similar to the first two. Finally, a fourth inflatable sealing gasket 135 is present coming up towards the second mouth 102. The distance between the third and fourth inflatable gaskets 130 and 135 is similar or identical to the distance between the first and second inflatable gaskets 120 and 125, whereas the distance between the second and third inflatable gaskets 125 and 130 is greater.

Other sealing means could be used, such as gaskets that expand by compression or O-rings or lip gaskets capable of expanding so as to be pressed against the inside wall of the pipeline. Gaskets that expand under compression may comprise elastomer elements suitable for being expanded by a wormscrew mechanism or a hydraulic system having movable plane or conical plates serving to compress elements made of elastomer.

Instead of being constituted essentially by a rigid cylinder, the pipe segment may be constituted by two rigid cylinders connected together by a bellows, in order to enable the tool to travel along a pipeline that presents curves such as bends.

FIG. 2 shows the same elements as can be seen in FIG. 1, in a section view on a plane containing the axis of revolution of the tool 1. It can be seen that the four inflatable gaskets are installed in grooves provided for this purpose in the surface of the pipe segment 100. It can also be seen that the guide wheels 110, whether close to the mouth 101 or to the mouth 102, are all configured in the same direction in order to make it easier for the tool to travel in the pipeline in a particular direction. These wheels may be movable radially in order to provide good guidance in spite of geometrical variations to be encountered in pipelines (manufacturing tolerances of the tubes, welds, curves, local deformations, . . . ). It is also specified that in the embodiment shown, the guide means 110 lie between the corresponding mouth (101 or 102) and the nearest inflatable gasket (120, 135), but that the guide means could be positioned elsewhere on the tool.

The tool also has propulsion means that are constituted in this example in particular by an adjustable flap 140 placed inside the pipe segment 100, halfway between the two mouths 101 and 102. The flap 140 is shown in its closed position in FIG. 2, thereby providing the tool with maximum drive by the fluid, while in FIG. 3 it is shown in its open position, thereby minimizing drive and making it easier to stop the tool. The flap 140 is motor-driven to pass from one of its positions to the other or to adopt an intermediate position, and to conserve the position it has adopted while the tool is moving with the stream. It thus provides a variable "windage" function depending on its degree of opening. The flap 140 thus enables the tool 1 to move inside the pipeline with the fluid, in the same direction as the fluid, by making use of the movement of the fluid to provide a drive phenomenon. The tool 1 also has a motor system for the flap 140, or the flaps if a plurality of flaps are used, and optionally, but not necessarily, an on-board source of energy. It is specified that instead of one or more flaps, it is possible to use one or more diaphragms or one or more adjustable grids. Furthermore, the system is designed to be remotely locatable or controllable by means of a communication system between the tool and the outside of the tube.

The tool 1 may also include an electromagnetic retarder (not shown) acting on the wheels to enable the speed of the tool to be reduced, but that does not enable the movement of the tool to be stopped completely.

The tool 1 may also include a braking system acting by friction against the inside wall of the pipeline (not shown).

The tool 1 may also include a system for holding the tool in a static position inside the pipeline by adhering to the inside wall of the pipeline once the tool has stopped in the position where action is to be taken.

The sealing means may be used in order to brake the movement of the tool by rubbing against the inside wall of the pipeline.

The sealing means may also be used to hold the tool in position by contact with the inside wall of the pipeline.

Conversely, it is possible to use a tool braking system that is distinct from the sealing means. By way of example, it could comprise a sacrificial gasket that is changed between two uses of the tool, or skids that come into contact with the wall of the pipeline, or indeed wheels that run along the wall of the pipeline and that have brakes.

It is also possible to use a system for holding the tool in position that is distinct from the sealing means. By way of example, this system could comprise metal jaws.

FIG. 4 shows the tool 1 moving in a fluid transport pipeline 200. The fluid may be a liquid or a gas. The pipeline may be buried, in the open air, or it may pass under the sea or under a lake.

The tool is previously inserted via a launch station (not shown), i.e. pipeline equipment that conventionally enables cleaning or inspection tools to be inserted into the pipeline. Before the tool is inserted, it is verified that the pipeline 200 is pistonable, i.e. that such an item can travel along the pipeline without becoming jammed therein. The tool 1 has an outside diameter that enables it to travel inside the pipeline 200, the guide means 110 being in contact with the inside surface of the wall of the pipeline 200 for guidance purposes. The tool is driven by the flow of fluid flowing in the pipeline, at a speed that depends on the extent to which the flap 140 is open and on the flow rate of the fluid. The fluid flows both around the tool 1 and through the inside of the pipe segment 100.

Figure 5:
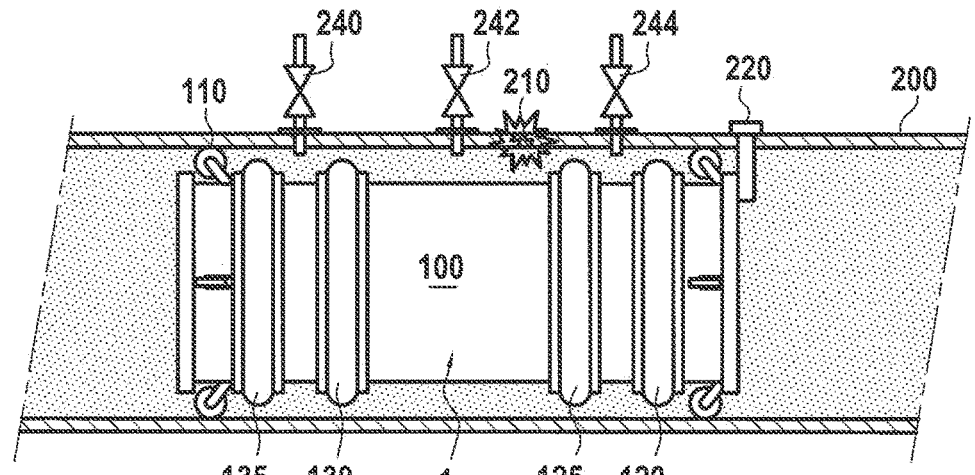
FIG. 5 shows the tool being positioned by being blocked by an abutment in the pipeline, in order to make a repair.

FIG. 5 shows the tool 1 stopped at a defect 210 that needs to be repaired in the wall of the pipeline 200. The tool 1 is stopped by its mouth 101 encountering an abutment 220 that has previously been put into place in the pipeline 200 from outside the pipeline. In an embodiment, the abutment 200 is put into place by hot tapping. The method may comprise welding a socket on the pipeline and then piercing the socket while the pipeline is under fluid pressure. In this example, a metal rod is implanted in the tap and forms an abutment inside the pipeline for an item having the diameter of the tool 1.

The abutment is positioned in the pipeline 200 in such a manner that the defect 210 faces the section of the pipe segment 100 that lies between these inflatable gaskets 125 and 130 once the tool is in position against the abutment. Furthermore, three taps 240, 242, and 244, each having its own decompression valve, are formed beforehand, or after the tool is in position, each facing a respective one of the sections of the pipe segment 100 between a pair of inflatable gaskets. These taps may be made by hot tapping.

Once the tool is stopped by the abutment 220, the fluid under pressure continues to flow around the tool, and also through the inside of the pipe segment 100. The flap 140 is opened so as to reduce the "windage" of the tool 1.

Figure 6:
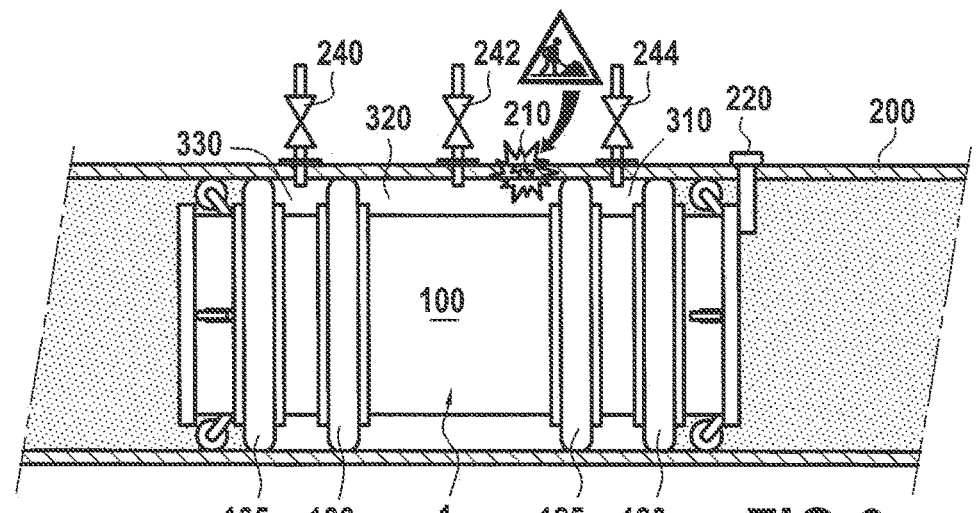
FIG. 6 shows the tool in the FIG. 5 position, after sealing has been put into place.

In FIG. 6, the inflatable gaskets 120, 125, 130, and 135 of the tool 1 are shown inflated. Each of these elements comes into contact with the wall of the pipeline to prevent fluid passing around the pipe segment 100. Thus, three sealed toroidal zones 310, 320, and 330 are created, each facing one of the taps 240, 242, and 244 fitted with its decompression valve. The fluid continues to flow through the inside of the pipe segment 100.

Using the valves in the taps 240, 242, and 244, each of the toroidal sealed zones 310, 320, and 330 is then decompressed, with the zone 320 between the inflatable gaskets 125, 130 being the main zone in which the action is to be taken, while the other two zones 310 and 330 serve as sealing locks for ensuring that there is no fluid leak into the main zone from the free zones of the pipeline 200, upstream and downstream.

It is specified at this point that although the embodiment shown thus makes use of two sealing locks 310 and 330, such locks are not essential elements, and the invention can thus be performed with only two inflatable gaskets. Nevertheless, it should be understood that the presence of these locks is highly advantageous.

It is also specified that although the presently-described embodiment uses three taps, one of the two taps 240 and 244 could be superfluous in the event of the tool having an internal channel enabling fluid to flow between the locks 310 and 330 formed by the gaskets.

Figure 7:
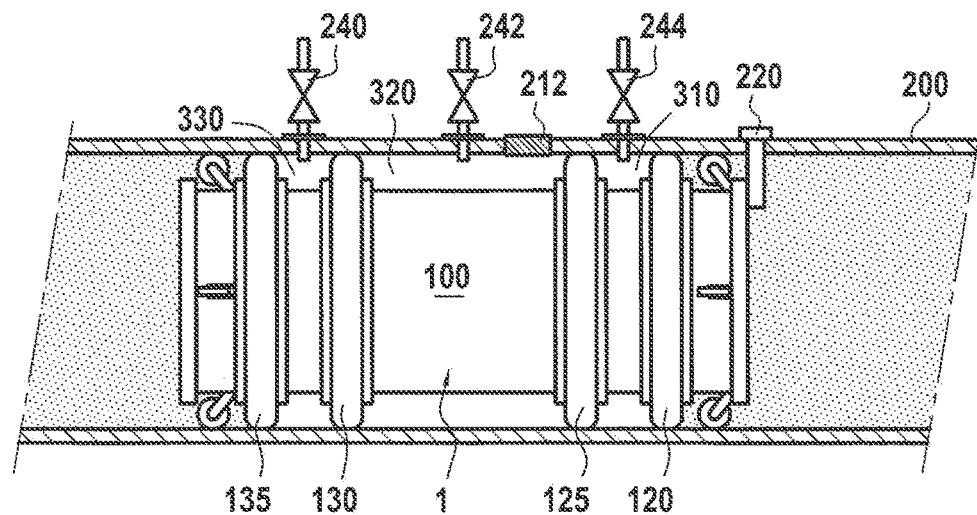
FIG. 7 shows the wall of the pipeline repaired, after pressure has been removed.

FIG. 7 shows the repair 212 to the defect 210, which repair may constitute welding a patch to take the place of the defective portion of the pipeline or making a repair by building out by welding, or by some other type of repair. This is done without pressure, and possibly after draining the fluid through the tap 242. Repair is preferably performed by taking action from the outside of the pipe, by an operator or by an apparatus.

Figure 8:
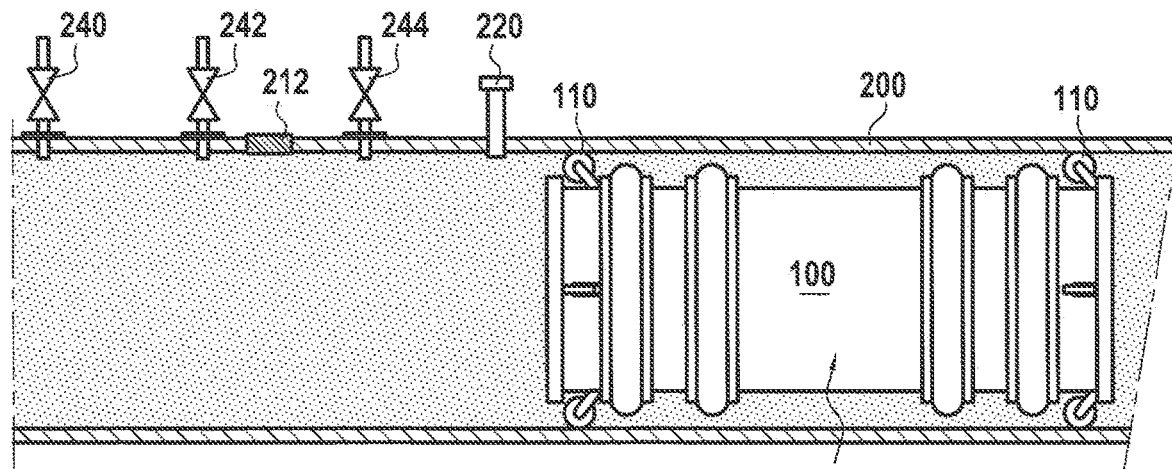
FIG. 8 shows the departure of the tool after the repair has been made and the abutment moved out of the way.

After the repair process, the inflatable gaskets 120, 125, 130, and 135 are deflated, and the entire pipeline 200 is thus put back under pressure, including in the zones 310, 320, and 330. As can be seen in FIG. 8, the abutment 220 is moved so that it no longer retains the tool 1 in the pipeline, and the tool 1 continues to travel in the flow direction of the fluid, at a speed that is determined by the extent to which the flap 140 is open and by the flow rate of the fluid, which flap is opened in order to be able to recover the tool quickly in an arrival station of the pipeline. At this stage, it is desirable to close off the taps 240, 242, and 244.

The invention is not limited to the embodiments described, but extends to any variant coming within the ambit of the scope of the claims.

By enabling the wall to be isolated from the fluid, the tool makes it possible in particular to perform a welding operation on pipelines in which the forced convection generated by the fluid would lead to excessive cooling that would be harmful for the mechanical soundness of the welding bead. This phenomenon can be encountered in certain pipelines as a function of the diameter, of the flow rate, and of the temperature of the fluid. Welding can thus be carried out with or without decompression of the zone that is sealed off by using the tool.

What is claimed is:

1. An intervention method for acting on a wall of a fluid pipeline using a tool, the method comprising:
   moving the tool inside the pipeline until a pipe segment of the tool is positioned facing a zone of the wall of the pipeline;
   creating sealing upstream and downstream from the zone using first and second seals of the tool so as to seal off an outer portion of a segment of the pipeline around the zone; and
   acting on the zone of the wall;
   wherein the sealing by the first and second seals occurs in two portions of the pipeline;
   wherein the first seal is in two portions and the second seal is in two portions; and
   wherein the two portions of the first seal define a first sealing lock between the two portions of the first seal and the two portions of the second seal define a second sealing lock between the two portions of the second seal.

2. The intervention method according to claim 1, wherein the first and second seals comprise expandable and retractable sealing gaskets that are actuated in expansion to create the sealing and that are retracted after action has been taken.

3. The intervention method according to claim 1, wherein the tool is propelled in the pipeline by movement of a fluid.

4. The intervention method according to claim 1, wherein the movement of the tool in the pipeline and the creation of the sealing are remotely controlled.

5. The intervention method according to claim 1, wherein:
   positioning of the tool in the pipeline is performed using an abutment placed inside the pipeline; and
   the method further comprises hot tapping the pipeline in order to put the abutment into place.

6. The intervention method according to claim 1, wherein:
   the outer portion of the segment of the pipeline is decompressed using a valve; and
   the method further comprises hot tapping the pipeline in order to put the valve into place.

7. The intervention method according to claim 1, wherein the first and second seals are used to brake the movement of the tool by rubbing against the wall of the pipeline.

8. The intervention method according to claim 1, wherein the first and second seals are used to hold the tool in position facing the zone by making contact with the wall of the pipeline.

9. The intervention method according to claim 1, wherein acting on the zone of the wall comprises making a repair with a welded patch, a repair by build-out welding, or a repair by welding on an outside surface of the pipeline.

10. The intervention method according to claim 1, further comprising:
    decompressing a sealed space between the first and second sealing locks using a valve.

11. The intervention method according to claim 1, further comprising:
    braking the tool until the pipe segment of the tool is positioned facing the zone of the wall of the pipeline.

12. The intervention method according to claim 1, further comprising:
    holding the tool in position by contact with the wall of the pipeline.

13. The intervention method according to claim 12, wherein holding the tool is performed by a system that is distinct from the first and second seals.

14. An intervention tool for taking action on a wall of a fluid pipeline, the intervention tool comprising:
    a pipe segment configured to be positioned inside the pipeline; and
    first and second seals configured to create sealing between the wall of the pipeline and the pipe segment in order to isolate an outer portion of a segment of the pipeline from fluid;
    wherein the first and second seals are configured to be positioned in two portions of the pipeline;
    wherein the first seal is in two portions and the second seal is in two portions; and
    wherein the two portions of the first seal are configured to define a first sealing lock between the two portions of the first seal and the two portions of the second seal are configured to define a second sealing lock between the two portions of the second seal.

15. The intervention tool according to claim 14, wherein the first and second seals comprise expandable and retractable sealing gaskets.

16. The intervention tool according to claim 14, further comprising:
an adjustable propulsion system.

17. The intervention tool according to claim 14, further comprising:
a propulsion system configured to make use of movement of the fluid in order to move the tool.

18. The intervention tool according to claim 17, wherein the propulsion system comprises at least one adjustable flap installed in the pipe segment.

19. The intervention tool according to claim 14, further comprising:
a guide system configured to guide movement of the tool inside the pipeline.

20. The intervention tool according to claim 19, wherein the guide system comprises at least one wheel or deformable disk at each end of the pipe segment.

21. The intervention tool according to claim 14, further comprising:
a braking system configured to brake the tool.

22. The intervention tool according to claim 14, further comprising:
a system configured to hold the tool in position by contact with the wall of the pipeline.

23. The intervention tool according to claim 22, wherein the system configured to hold the tool in position is distinct from the first and second seals.

24. The intervention tool according to claim 14, further comprising:
a system configured to enable the tool to be located and controlled remotely.

25. An apparatus comprising:
a pipe segment configured to be positioned inside a pipeline; and
first and second seals separated from each other and configured to create sealing between a wall of the pipeline and the pipe segment in order to isolate a portion of the wall of the pipeline from fluid;
wherein the first seal comprises multiple portions and is configured to define a first sealing lock between the portions of the first seal; and
wherein the second seal comprises multiple portions and is configured to define a second sealing lock between the portions of the second seal.

26. The apparatus of claim 25, wherein:
the first seal is located on a first half of the pipe segment; and
the second seal is located on a second half of the pipe segment.

* * * * *